(12) United States Patent
Fenet et al.

(10) Patent No.: US 10,217,469 B2
(45) Date of Patent: Feb. 26, 2019

(54) GENERATION OF A SIGNATURE OF A MUSICAL AUDIO SIGNAL

(71) Applicant: INSTITUT MINES TELECOM, Paris (FR)

(72) Inventors: Sebastien Fenet, Cachan (FR); Yves Grenier, Magny les Hameaux (FR); Richard Gael, Viroflay (FR)

(73) Assignee: INSTITUT MINES TELECOM-TELECOME PARISTECH, Paris (FR)

( * ) Notice: Subject to any disclaimer, the term of this patent is extended or adjusted under 35 U.S.C. 154(b) by 279 days.

(21) Appl. No.: 14/769,998

(22) PCT Filed: Feb. 25, 2014

(86) PCT No.: PCT/FR2014/050399
§ 371 (c)(1),
(2) Date: Aug. 24, 2015

(87) PCT Pub. No.: WO2014/131984
PCT Pub. Date: Sep. 4, 2014

(65) Prior Publication Data
US 2016/0005412 A1    Jan. 7, 2016

(30) Foreign Application Priority Data
Feb. 27, 2013 (FR) ...................... 13 51752

(51) Int. Cl.
*G10L 19/018* (2013.01)
*G06F 17/30* (2006.01)
(Continued)

(52) U.S. Cl.
CPC ...... *G10L 19/018* (2013.01); *G06F 17/30743* (2013.01); *G10H 1/0008* (2013.01);
(Continued)

(58) Field of Classification Search
CPC ..... G10L 19/018; G10L 25/54; G10H 1/0008; G10H 2210/081; G10H 2250/031;
(Continued)

(56) References Cited

U.S. PATENT DOCUMENTS 7,580,832 B2    8/2009 Allamanche et al.
7,627,477 B2    12/2009 Wang et al.
(Continued)

FOREIGN PATENT DOCUMENTS

EP    2 106 050    9/2009
WO    WO 2002/065782    8/2002
(Continued)

OTHER PUBLICATIONS

Alonso, et al., "Accurate Tempo Estimation Based on Harmonic + Noise Decomposition", EURASIP Journal of Advances in Signal Processing, GET—Telecom, Paris, 2007, 17pgs.
(Continued)

*Primary Examiner* — Tammy Paige Goddard
*Assistant Examiner* — Bharatkumar S Shah
(74) *Attorney, Agent, or Firm* — Frost Brown Todd LLC

(57) ABSTRACT

The invention concerns a method for generating a signature of a musical audio signal of a given duration, the method comprising the following steps: —modelling (104) the musical audio signal to obtain, for each frequency band of a set of n frequency bands, a diagram representing the energy of the audio signal for the frequency band, on the basis of the time during said given duration; —determining (103) musical transition times $t_k$ of the audio signal during the given duration; —associating (105) each musical transition time tk with an item of local information comprising a vector of n values representative, respectively, of the energy of the audio signal in each of the n diagrams obtained between musical transition time tk and a subsequent musical
(Continued)

transition time tk+1 and/or a vector of n values representative, respectively, of the energy of the audio signal in each of the n diagrams obtained between musical transition time tk and a preceding musical transition time tk−1; —determining (106), on the basis of the local information associated with each musical transition time tk, a key associated with the musical transition time, the determined keys forming a first set of keys of the audio signal; —generating (107) a signature of the musical audio signal comprising pairs of keys from the first set of keys and associated musical transition times tk.

6 Claims, 3 Drawing Sheets

(51) Int. Cl.
  *G10L 25/54*   (2013.01)
  *G10H 1/00*   (2006.01)
  *H04H 60/37*   (2008.01)
  *H04H 60/58*   (2008.01)
(52) U.S. Cl.
  CPC ........ *G10L 25/54* (2013.01); *G10H 2210/051* (2013.01); *G10H 2210/081* (2013.01); *G10H 2220/005* (2013.01); *G10H 2240/141* (2013.01); *G10H 2250/031* (2013.01); *H04H 60/37* (2013.01); *H04H 60/58* (2013.01)
(58) Field of Classification Search
  CPC ....... G10H 2210/051; G10H 2240/141; G10H 2220/005; G06F 17/30743; H04H 60/58; H04H 60/37
  USPC ........................................................ 704/500
  See application file for complete search history.

(56) References Cited

U.S. PATENT DOCUMENTS

| | | |
|---|---|---|
| 7,921,296 B2 | 4/2011 | Haitsma et al. |
| 9,299,364 B1* | 3/2016 | Pereira ................... G10L 25/51 |
| 2009/0234649 A1* | 9/2009 | Goodhew ............. G10L 19/018 |
| | | 704/243 |
| 2010/0195837 A1* | 8/2010 | Srinivasan .............. G10L 25/48 |
| | | 381/56 |

FOREIGN PATENT DOCUMENTS

| | | |
|---|---|---|
| WO | WO 2003/091990 | 11/2003 |
| WO | WO 2014/131984 | 9/2014 |

OTHER PUBLICATIONS

Alonso, M., et al., "Extracting Note Onsets From Musical Recordings", ICME, 2012 IEEE International Conference on Multimedia and Expo, 2005, 4 pgs.
Cano, P., et al., "Audio Fingerprinting Concepts and Applications", Chapter 17, Computational Intelligence for Modeling and Prediction, vol. 2 of the series Studies in Computation Intelligence, pp. 233-245, Aug. 8, 2005.
Gillet, O., et al., "Drum loops retrieval from spoken queries", Journal of Intelligent Information Systems, 24:2/3, 159-177, 2005, 20 pgs.
Haitsma, J., et al., "Robust Audio Hashing for Content Identification", Content-Based Multimedia Indexing (CBMI), 2001, 8 pgs.
Wang, A.L.-C., "An Industrial-Strength Audio Search Algorithm", Proceedings of 4$^{th}$ International Symposium Conference on Music Information Retrieval, Oct. 23, 2003, 7 pgs., XP002632246.
International Search Report and Written Opinion dated May 21, 2014 for Application No. PCT/FR2014/050399.
International Preliminary Report on Patentability dated Sep. 1, 2015 for Application No. PCT/FR2014/050399.
European Exam Report dated Mar. 16, 2018 for Application No. EP 14713179.1, 6 pgs.

* cited by examiner

GENERATION OF A SIGNATURE OF A MUSICAL AUDIO SIGNAL

The present invention relates to the generation of a signature in order to identify audio signals.

More specifically, it relates to the identification of musical audio signals by fingerprint extraction (commonly known as "audio-fingerprinting")

The purpose of identifying audio signals is to retrieve meta-data so as to associate it with an audio excerpt that was a priori unknown. Mobile terminals such as mobile phones of the smart phone type are tending to incorporate such identification applications. To this end, the user captures an audio excerpt by means of the microphone of his smart phone and the application sends a set of meta-data such as the title of a song, the name of an artist, the name of an album, etc.

The identification of audio signals also has applications in automatic copyright control, automatic segmentation and annotation of multimedia streams, jingle detection, etc.

Fingerprint extraction is the most widespread tool for carrying out the identification of query audio signals when no meta-data is attached to the unknown audio signal. It consists of extracting, from reference audio signals, a compact representation (fingerprint or signature) which is then stored in a database. On identifying a query audio signal, its signature is extracted. A search for the best match with the extracted signature is then carried out in the database comprising the signatures of the reference audio signals.

Many examples of models of fingerprints (or signatures) are known, as well as many methods of searching for the best match.

In particular, two objectives are generally prioritized in the known methods:
- the captured (query) audio signal must be recognized even if it has suffered a series of distortions;
- the algorithm utilized must be capable of generating a database containing very large quantities of reference audio signals.

In the state of the art, the robustness to distortion is generally defined as the robustness to different post-processings of the audio signal. In fact, the problem generally considered is the identification of a signal which has been cropped, re-equalized, amplitude-compressed, time-stretched, pitch-shifted, and/or recorded in an environment with a poor quality microphone. In other words, it is a matter of distortions introduced into the transmission channel when the audio signal is broadcast.

According to the methods, the robustness more or less covers these types of distortions, but these distortions all correspond to post-processing applied to a reference signal. The query audio signal thus corresponds to one of the reference audio signals to which a series of distortions has been applied, and the identification consists of retrieving the reference audio signal. Such identification is known as "near-exact matching".

In audio, two similar audio signals are defined as two audio signals which have the same harmonic, rhythmic and melodic characteristics. Intuitively, these are two audio signals that a human being would consider close.

However, the conventional methods based on fingerprint extraction generally do not deal with the case in which two audio signals are similar. This means in particular that if the system has learned a title (then stored in a database in the form of a reference audio signal) and identification of a cover version of this title is requested (query audio signal) the system will be unable to show the match.

More annoyingly, one and the same title, with the same instrumentation, which is re-recorded by the same artist, will not be considered to correspond to the original title. In fact, although to the human ear the two recordings seem to be the same, the slight variations which exist between the two versions (slight rhythm shifts, singing slightly changed, instrumental performance a little different) make the signals thereof radically different from an information technology point of view.

The identification of two similar audio signals is known as "approximate matching".

Such limitations are mainly due to the fact that the classical methods based on fingerprint extraction use low-level information to characterize the signal. This information, which incorporates very little of musical significance, is not retained from one version to another of the same title.

Thus the methods based on fingerprint extraction are rarely used in the fields of musical resemblance or the detection of cover versions.

Moreover, approaches making it possible to match two different versions of one and the same song have been developed. However, such approaches are unable to process large databases of reference signals. In fact, these methods are resource-intensive and require the reference audio signals to be compared one by one with the query audio signals.

A need therefore exists to define a signature of an audio signal which allows at the same time near-exact matching and approximate matching of audio signals, while making it possible to manage large-scale databases.

The present invention aims to improve the situation.

According to a first aspect of the invention, a method is described for the generation of a signature of a musical audio signal of a given duration, the method comprising the following steps:
- modelling of the musical audio signal in order to obtain, for each frequency band of a set of n frequency bands, a diagram representing the energy of the audio signal for the frequency band, as a function of time during the given duration;
- determining musical transition times $t_k$ of the audio signal during the given duration;
- associating each musical transition time $t_k$ with an item of local information comprising a vector of n values representative, respectively, of the energy of the audio signal in each of the n diagrams obtained between the musical transition time $t_k$ and a subsequent musical transition time $t_{k+1}$ and/or a vector of n values representative, respectively, of the energy of the audio signal in each of the n diagrams obtained between the musical transition time $t_k$ and a preceding musical transition time $t_{k-1}$;
- determining, as a function of the item of local information associated with each musical transition time $t_k$, a key associated with the musical transition time, the determined keys forming a first set of keys of the audio signal;
- generating a signature of the musical audio signal comprising couples, each couple comprising a key from the first set of keys and an associated musical transition time $t_k$.

The method also makes it possible to generate a signature that is representative of rhythmic and harmonic information on the musical audio signal. Thus, the keys obtained according to the aforementioned method can be common to two versions of the same audio title, and the signature can be used in the context of approximate matching. Moreover, as the signature is compact, it allows effective comparison over a significant signal duration which is necessary in particular in the context of approximate matching.

By musical audio signal is meant a query audio signal (that it is sought to identify) or a reference audio signal (for storage in a database and for subsequent comparison with a query audio signal).

According to an embodiment of the invention, the keys of the first set of keys can be obtained by quantization of the vectors of n values representative, respectively, of the energy of the signal in each frequency band of the set of n frequency bands in a period comprised between the musical transition time $t_k$ and a subsequent musical transition time $t_{k+1}$ or by quantization of the vectors of n values representative, respectively, of the energy of the signal in each frequency band of the set of n frequency bands in a period comprised between the musical transition time $t_k$ and a preceding musical transition time $t_{k-1}$.

The quantization used to generate the keys makes it possible to lower the selectivity operated on the basis of these keys. By quantizing vectors of energy values originating from two similar but different signals, it is possible to obtain the same key twice, and thus to be able to identify a query signal in an approximate manner.

According to an embodiment of the invention, each key in the first set of keys can be a vector of n bits, each bit of index i being determined by comparison between the energy value of index i in the vector of n values on the basis of which the key is determined, and the average of the values of the vector of n values.

Thus, the quantization applied to the values of the vectors is maximum, which makes it possible to lower the selectivity of the keys while still maintaining significance from a musical point of view (use of a vector of n bits associated with a representative musical transition time).

In addition, if the energy value of the index i in the vector of n values on the basis of which the key is determined is greater than the average of the values of said vector of n values, then the bit of index i can be equal to 1, the bit of index i otherwise being equal to 0.

According to an embodiment of the invention, the musical transition times $t_k$ correspond to the local maxima of an onset function calculated on the basis of the musical audio signal By onset function is meant any function the role of which is to estimate note attacks and percussive attacks in an audio signal. By way of example, a function of this type is described in the publication "*Accurate Tempo Estimation Based on Harmonic+Noise Decomposition*" by Alonso et al, 2007.

Such a realization makes it possible to ensure that the musical transition times are significant from a rhythmic point of view.

A second aspect of the invention relates to a method for identifying a query musical signal among reference musical signals, the query musical signal and the reference signals being represented by respective signatures obtained by implementation of the method according to the first aspect of the invention, each signature of a reference signal thus comprising a second set of keys with which are associated respective musical transition times $\tau_k$, the method comprising the steps:

for each signature of a reference signal having at least one key from the second set in common with the first set of keys of the signature of the query signal, constituting a third set of keys comprising the at least one key from the second set in common with the first set, each key from the third set being associated both with the musical transition time associated with the key in the signature of the reference signal, and with the musical transition time associated with the key in the signature of the query signal;

determining a score as a function of a match between each couple of musical transition times associated with each key in the third set; and selecting at least one signature of a reference signal having one of the highest scores, as a signature of a candidate reference signal to correspond to the query signal.

This embodiment thus makes it possible to obtain with reduced complexity a subset of signatures of the reference audio signals which are likely to match the query audio signal in a near-exact or approximate manner.

In addition, it is possible to select a set of signatures of reference signals having the highest scores, and a post-processing can be applied:

to candidate reference signals, represented by the signatures of said set, and to the query signal, and a step of identifying the query signal as one of the reference signals.

Thus it is possible to apply a post-processing, which utilizes generally complex calculations, to a reduced set of candidate reference signals, which makes it possible to reduce the resources required for identifying the query signal, in comparison with the same post-processing applied to the whole of the database.

As a variant, or in addition, determining the score of a signature of a reference signal comprises the following steps:

determining an affine function matching a greater number of musical transition times of the reference signal that are associated with the keys of the third set with the musical transition times of the query signal that are associated with the respective keys of the third set.

The score allocated to the signature of the reference signal can thus be equal to the aforementioned greater number.

Such a realization makes it possible to select with reduced complexity signatures of reference signals having a high score, the score being representative of a musical resemblance between the audio signals.

In addition, the affine function can be obtained by applying a Hough transform to the set of couples of musical transition times associated with the keys of the third set.

According to an embodiment, determining the score of a reference audio signal can comprise the following steps:

constructing a scatter plot, each dot corresponding to a key in the third set, the x-axis of the dot being the musical transition time of the reference signal associated with the key in the third set and the y-axis of the dot corresponding to the musical transition time of the query signal associated with the key in the third set;

determining a straight line connecting a maximum of dots of the constructed scatter plot;

determining the score of the signature of the reference signal as equal to the number of dots connected by the determined straight line in the scatter plot.

In addition or as a variant, the post-processing is applied successively for each reference signal corresponding to a selected signature, and to the query signal modified as a function of the affine function determined for obtaining the score of the signature of the reference signal.

Thus, this embodiment makes it possible to benefit from information originating from the step of obtaining an affine function (which can be the straight line in the previously introduced scatter plot), in the context of the post-processing, thus improving the effectiveness of the identification method.

In addition, the query signal is modified by scaling the query signal as a function of a slope of the affine function and by time cropping of the query signal as a function of a y-axis at the origin of the affine function.

Such an embodiment makes it possible to ensure that the reference audio signal and the modified query audio signal are compared with one and the same time stretch and based on the same start time.

A third aspect of the invention relates to a computer program containing instructions for implementing the method according to the first aspect of the invention, when this program is executed by a processor.

A fourth aspect of the invention relates to a computer program containing instructions for implementing the method according to the second aspect of the invention, when this program is executed by a processor.

A fifth aspect of the invention relates to a device for generating a signature of a musical audio signal of a given duration, the device comprising:
- a unit for modelling the musical audio signal in order to obtain, for each frequency band of a set of n frequency bands, a diagram representing the energy of the audio signal for the frequency band, as a function of time during the given duration;
- a first unit determining musical transition times $t_k$ of the audio signal during the given duration;
- a unit associating each musical transition time $t_k$ with an item of local information comprising a vector of n values representative respectively of the energy of the audio signal in each of the n diagrams obtained between the musical transition time $t_k$ and a subsequent musical transition time $t_{k+1}$ and/or a vector of n values representative respectively of the energy of the audio signal in each of the n diagrams obtained between the musical transition time $t_k$ and a preceding musical transition time $t_{k-1}$;
- a second unit determining, as a function of the item of local information associated with each musical transition time $t_k$, a key associated with the musical transition time, the determined keys forming a first set of keys of the audio signal;
- a unit for generating a signature of the musical audio signal comprising couples, each couple comprising a key from the first set of keys and an associated musical transition time $t_k$.

A sixth aspect of the invention relates to a device for identifying a query musical signal among reference musical signals, the query musical signal and the reference musical signals being represented by respective signatures obtained by implementation of the method according to the first aspect of the invention, each signature of a reference signal thus comprising a second set of keys with which are associated respective musical transition times $\tau_k$, the device comprising:
- a unit for constituting, for each signature of a reference signal having at least one key from the second set in common with the first set of keys of the signature of the query signal, a third set of keys comprising the at least one key from the second set in common with the first set, each key from the third set being associated both with the musical transition time associated with the key in the signature of the reference signal, and with the musical transition time associated with the key in the signature of the query signal;
- a unit for determining a score as a function of a matching between each couple of musical transition times associated with a key in the third set; and
- a unit for selecting at least one signature of a reference signal having one of the highest scores, as signature of a candidate reference signal in order to identify the query signal.

Other features and advantages of the invention will become apparent on examination of the detailed description below, and the attached drawings in which.

In a step 101, a musical audio signal is received by a device for the generation of a signature according to the invention, which will be illustrated subsequently with reference to FIG. 5. Such a musical audio signal can correspond to an audio signal for which the user would like to access meta-data, such as the name of the artist or the title. Such an audio signal is called a query audio signal. The musical audio signal can also correspond to a reference audio signal the signature of which is intended to be stored in a database with a view to a subsequent comparison with a signature of a query audio signal (as detailed below with reference to FIG. 3) with a view to identifying the query audio signal.

As explained previously, the invention relates to allowing not only near-exact matching (i.e. effective search for an audio excerpt in a large database with robustness to distortion) but also approximate matching (namely identifying an audio excerpt with a reference audio signal which is similar thereto within a large database).

Based on the musical audio signal received, a step of determining states of the musical audio signal is carried out with reference to step 102.

Step 102 comprises, in a step 103, the determination of musical transition times $t_k$ of the musical audio signal, during the given duration of the musical audio signal.

In parallel with step 103, in a step 104, the step of determining states comprises the modelling of the musical audio signal in order to obtain, for each frequency band of a set of n frequency bands, a diagram representing the energy of the audio signal for the frequency band in question, as a function of time during the aforementioned given duration.

Figure 2:
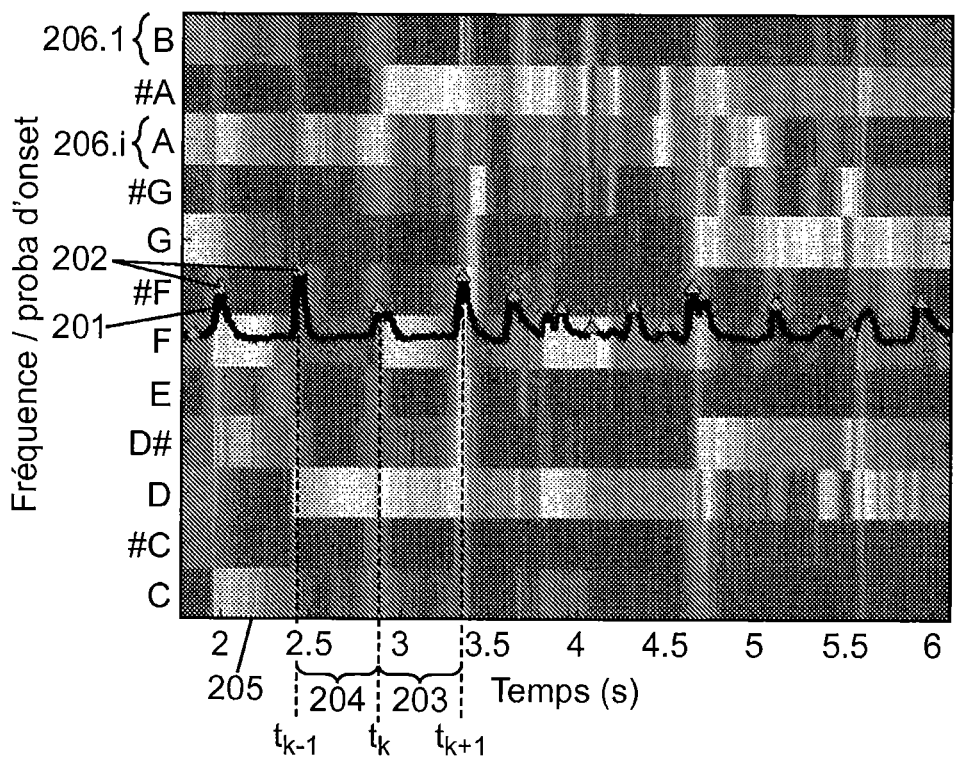
FIG. 2 shows a superimposition of an onset function calculated on the basis of a musical audio signal and from a chromagram determined on the basis of the same musical audio signal according to the invention.

Steps 103 and 104 will be better understood with reference to FIG. 2, which shows a superimposition of an onset function 201 calculated on the basis of the musical audio signal and a chromagram 205 determined on the basis of the musical audio signal. It should be noted that the determination of the chromagram 205 and of the onset function 201 can both require the application of a Fourier transform to the query audio signal, with different windowings. In order to avoid any time shifting between the onset function 201 and the chromagram 205, provision can be made in the invention to synchronize the Fourier transforms.

The present invention can for example provide detection of the musical transition times $t_k$ as corresponding to the local maxima 202 of the onset function.

The chromagram 205 is constituted by n diagrams 206.$i$, i varying from 1 to n, illustrating the energy of the musical audio signal for each frequency band. The greater the energy, the lighter the chromagram is.

The method according to the invention next comprises a step 105 of defining states of the musical audio signal. A state $s_k$ is defined by associating a time $t_k$ with an item of local information $1_k$:

$$s_k = (t_k, i_k).$$

The item of local information $i_k$ can be given by the following characteristics:

$$I_k = (c_{k,l}, c_{k,r})$$

in which $c_{k,l}$ is a mean chroma vector to the left of $t_k$ and $c_{k,r}$ is a mean chroma vector to the right of $t_k$.

The vector $c_{k,r}$ is a vector of n values representative respectively of the energy of the musical audio signal in each of the n diagrams 206 obtained in the period 203 between the musical transition time $t_k$ and a subsequent musical transition time $t_{k+1}$. The vector $c_{k,l}$ is a vector of n values representative respectively of the energy of the query audio signal in each of the n diagrams 206.$i$ obtained in the period 204 between the musical transition time $t_k$ and a preceding musical transition time $t_{k+1}$. For example, the component of index i of the vector $c_{k,r}$ (hereinafter denoted $c_{k,r,i}$) corresponds to the average energy of the frequency band represented by the diagram 206.$i$ over the period 203 and the component of index i of the vector $c_{k,l}$ (hereinafter denoted $c_{k,l,i}$) corresponds to the average energy of the frequency band represented by the diagram 206.$i$ over the period 204.

It should be noted that the item of local information $i_k$ can correspond only to the mean chroma vector $c_{k,r}$ to the right of $t_k$ or to the mean chroma vector $c_{k,l}$ to the left of $t_k$.

The advantage of the definition of states presented above is that the query audio signal is represented in a compact form representative of rhythmic and harmonic information on the musical audio signal. Thus, the present invention allows near-exact matching applications but also approximate matching of a query audio signal.

The method according to the invention then comprises a step 106 of determining, as a function of the item of local information associated with each musical transition time $t_k$, a key associated with the musical transition time $t_k$, the determined keys forming a first set of keys of the musical audio signal;

A first set of keys should be generated, which are invariant with respect to the variations in the musical audio signal and sufficiently discriminative. The invariance with respect to variations must cover the classical post-processing distortions (equalization, pitch shifting, etc) but also recordings of one and the same title under different conditions (matching of similar audio signals).

According to the invention, a key can be determined for each determined state $s_k$ of the musical audio signal, and can correspond to a quantized version of one of the vectors $c_{k,l}$ and $c_{k,r}$. The example used hereinafter will be that of a quantized version of the vector $c_{k,r}$. Each component $c_{k,r,i}$ of the vector $c_{k,r}$ can for example be quantized using a single bit $\tilde{c}_{k,r,i}$ in the following manner:

$$\tilde{c}_{k,r,i} = \begin{cases} 1 & \text{if } c_{k,r,i} > \overline{c}_{k,r} \\ 0 & \text{otherwise} \end{cases}$$

with $\overline{c}_{k,r}$ corresponding to the average of the $c_{k,r,i}$s for i varying between 1 and n.

Thus, the quantization of the vector $c_{k,r}$ is deterministic. Provision can also be made in the invention, so as to limit the risk of changing a key at this stage of the procedure, to generate a probabilistic set of binary vectors $\tilde{c}_{k,r}$ associated with their respective probabilities.

Each binary vector $\tilde{c}_{k,r}$ constitutes a key of the musical audio signal and is stored in association with the musical transition time $t_k$.

The first set of keys generated in this way and the times $t_k$ respectively associated with these keys thus form a signature of the musical audio signal, in a step 107.

Such a signature according to the invention contains rhythmic and harmonic information on the musical audio signal, thus allowing approximate matching as well as near-exact matching. Such a method for the generation of a signature is applied both to the query audio signal and also to the reference audio signal with a view to the storage of their respective signatures in a database.

When the method described above is applied to a reference audio signal, provision is made moreover for the definition of an index function. By index function is meant a function which inputs a key and returns a set of values.

The benefit of such an operation is that it can potentially be carried out with a complexity O(1). In the present case, the values are pointers to the reference audio signals in the database and the keys are audio characteristics which characterize these reference audio signals.

Thus, when the method for the generation of a signature has been applied to all the reference audio signals, the keys of all the references are extracted and stored in the index. Thus, the values of a key correspond to the identifiers of the reference audio signals as well as the musical transition times $t_k$ corresponding to the key in the reference audio signals.

Figure 1:
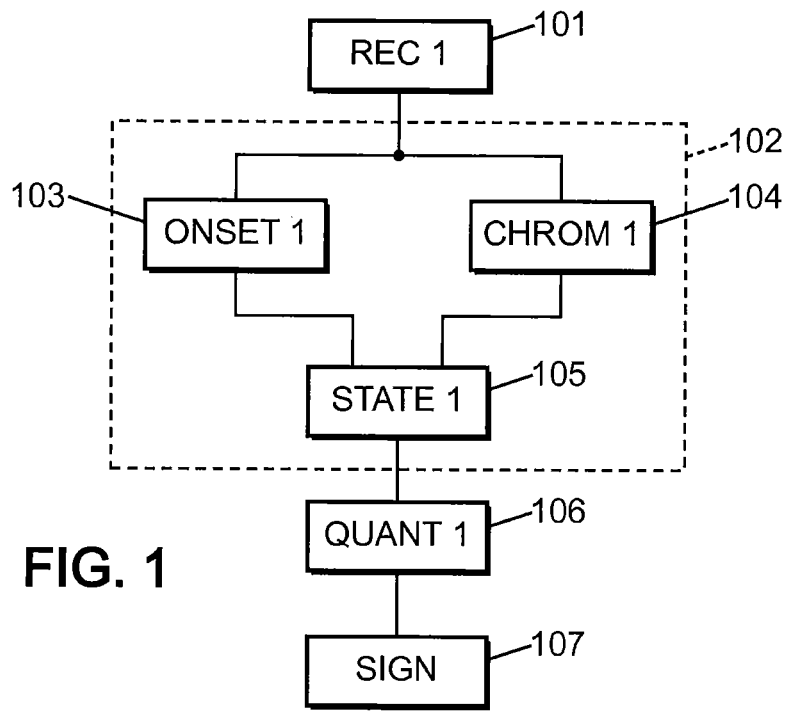
FIG. 1 shows a method for the generation of a signature of a musical audio signal of a given duration according to the invention.
Figure 3:
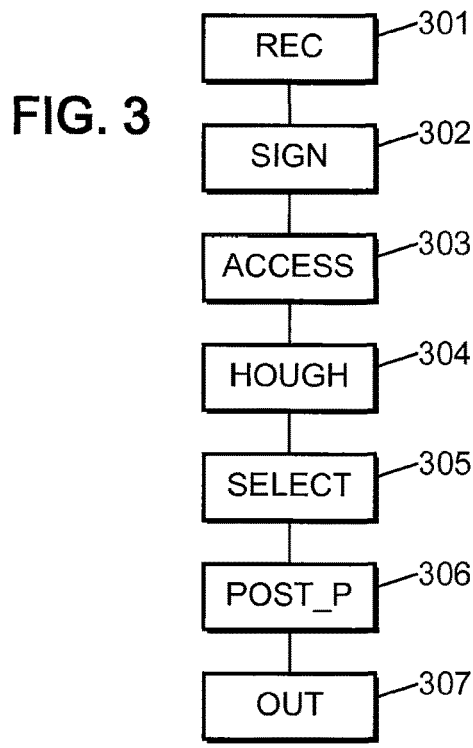
FIG. 3 shows a method for identifying a query musical audio signal from reference musical audio signals, the query audio signal and the reference audio signals being represented by respective signatures obtained by implementation of the method according to FIG. 1.

FIG. 3 shows a method for identifying a query musical audio signal among reference musical audio signals, the query audio signal and the reference audio signals being represented by respective signatures obtained by implementation of the method according to FIG. 1.

In a step 301, a query audio signal is received by an identification device which will subsequently be presented with reference to FIG. 6.

In a step 302, a signature of the query audio signal is obtained, by applying the method according to FIG. 1 to the query audio signal. The signature thus comprises a first set of keys K associated respectively with musical transition times $t_k$ (it should be noted that the index k of the musical transition times is independent of the symbol K representing a key).

In a step 303, access is gained to a database comprising the signatures of the reference audio signals, with a view to constituting, using the index function, and for each signature of the reference signal having at least one key from the second set in common with the first set of keys of the signature of the query signal, a third set of keys comprising the keys from the second set in common with the first set. It should be noted that a key K in the third set can be associated with several musical transition times in the first set and/or with several musical transition times in the second set.

The method then comprises a step 304 of determining a score as a function of a matching between each couple of musical transition times associated with each key in the third set. Determining the score is carried out for each signature of the reference signal comprising at least one key in common with the first set of keys of the signature of the query audio signal. Determining the score can for example consist of determining an affine function matching a greater number of musical transition times of the reference signal that are associated with the keys in the third set with the musical transition times of the query signal that are associated with the same keys in the third set, the score allocated to the signature of the reference signal being equal to the aforementioned greater number.

Figure 4:
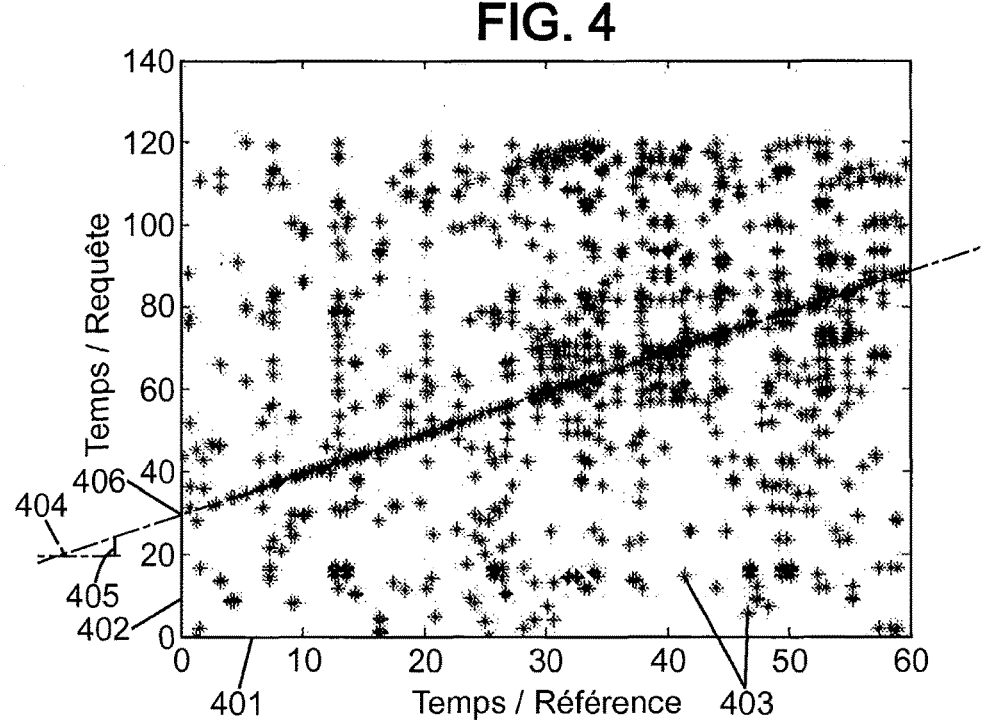
FIG. 4 is a time/time diagram representing a scatter plot according to an embodiment of the invention.

A detailed example of determining the score of a signature of the reference signal based on the third set of keys common to this signature of the reference signal and to the signature of the query signal is shown with reference to FIG. 4.

FIG. 4 is a time/time diagram representing a scatter plot 403, each dot corresponding to a key in the third set, the x-axis 401 of the dot being the musical transition time of the reference signal associated with the key in the third set and the y-axis of the dot corresponding to the musical transition time of the query signal associated with the key in the third set. Thus a scatter plot is constructed for each signature of the reference signal which shares at least one key in common with the signature of the query signal.

Based on this scatter plot, a straight line 404 is determined connecting a maximum of dots of the constructed scatter plot. Determining the straight line 404 can be carried out by applying a Hough algorithm to the set of couples of musical transition times associated with the keys in the third set.

The score of the signature of the reference signal for which the scatter plot was constructed can then be equal to the number of dots connected by the straight line 404 determined in the scatter plot. In FIG. 4, it can be seen that a straight line 404 comprising a large number of dots is obtained. The fact that many dots are situated outside the straight line is explained by the fact that a key from the first set can be present several times in the second set. This reflects the repetition of a key in the title represented by the reference audio signal. It should moreover be borne in mind that due to the very strong quantization applied in order to determine the keys, the latter are not very discriminative (which is intentional, and useful for allowing approximate matching of the query audio signal).

In a step 305, at least one signature of a reference signal having one of the highest scores is selected, as a signature of a candidate reference signal to correspond to the query signal. For example, provision can be made in the invention to select M signatures of candidate reference signals, M being able to be predetermined or being able to depend on the number of keys in the first set of keys of the signature of the query signal, for example. No restriction is attached to the value of M.

In a step 306, a set of signatures of reference signals having the highest scores is selected, and post-processing is applied:

to candidate reference signals, represented by the signatures of the set, and to the query signal, with a view to identifying the query signal as one of the reference signals. The set of signatures can for example comprise the aforementioned M signatures.

Such a step of post-processing can utilize complex calculations, without however involving too many resources, inasmuch as the database of reference signals has been reduced to M candidate reference signals.

An example of post-processing is described below. However, the invention is in no way restricted to this example, and any known method can be applied for selecting one of the candidate reference audio signals as a match for the query audio signal. The state of the art proposes numerous techniques for this purpose.

At this stage of the procedure, the selected M reference audio signals should be compared with the query audio signal.

By way of example, there is proposed below a dynamic programming approach which is based on the modelling of audio signals by states as previously described.

Firstly, for each signature of a reference signal having keys in common with the first set of keys, the query audio signal can be modified as a function of the affine function determined for obtaining the score of the signature of the reference signal.

In fact, the straight line 404 defines an affine function characterized by a slope referenced 405 in FIG. 4 and denoted a, and by a y-axis at the origin referenced 406 and denoted b. The straight line 404 means that a key extracted from the query audio signal at a time t will correspond to a key in the reference audio signal at time a(t−b).

The inverse of a then represents a time stretching of the query audio signal while b represents the time in the reference audio signal at which the query audio signal starts. Thus, the query audio signal can be modified by scaling the query signal as a function of the slope a and by time-cropping of the query audio signal as a function of the y-axis at the origin b.

The query audio signal thus modified is represented by the sequence of states $\{s_1 \ldots s_i \ldots s_m\}$, m being the number of musical transition times determined previously in the time interval corresponding to the duration of the query audio signal. In order to represent the states of the candidate reference signals, use will be made hereinafter of the notation $\{\sigma_1 \ldots \sigma_j \ldots \sigma_p\}$, p being the number of musical transition times in the candidate reference signal, p being dependent on the candidate reference signal.

In order to dynamically align two sequences of states, three types of penalties should be defined:

$f^d(s_i)$: penalty assigned for the deletion of state $s_i$;

$f^i(s_i)$: penalty assigned on insertion of state $s_i$;

$f^s(s_i, \sigma_j)$: penalty assigned to the substitution of state $s_i$ by state $\sigma_j$.

By way of example, the functions $f^d$ and $f^i$ can both adopt a constant value equal to 0.3.

Knowing that $s_i=(t_i,(c_{i,l},c_{i,r}))$ and $\sigma_j=(\tau_j,(\gamma_{j,l},\gamma_{j,r}))$ denoting $\tau_j$ the musical transition time of index j in the reference signal, $\gamma_{j,l}$ the mean chroma vector to the left of $\tau_j$, and $\gamma_{j,r}$ the mean chroma vector to the right of $\tau_j$, $f^s$ is defined by:

$$f^s(s_i, \sigma_j) = \cos(c_{i,l}, \gamma_{j,l}) \cdot \cos(c_{i,r}, \gamma_{j,r}) \cdot e^{\frac{|t_i - \tau_j|}{c}}$$

The first cosine term penalizes the resemblance of the mean chroma vector to the left of $t_i$ with the mean chroma vector to the left of $\tau_j$. The second cosine term penalizes the resemblance of the mean chroma vector to the right of $t_i$ with the mean chroma vector to the right of $\tau_j$. The exponential term penalizes the timing error between the occurrence of state $s_i$ in the modified query signal, and the occurrence of state $\sigma_j$ in the reference signal.

Dynamic programming consists of iteratively filling a matrix D. For each couple $(i,j) \in \{1 \ldots m\} \times \{1 \ldots p\}$, $D(i,j)$ contains the score of the alignment of the subsequence $\{s_1 \ldots s_i\}$ with the sub-sequence $\{\sigma_1 \ldots \sigma_j\}$. D is calculated as follows:

$$D(i, j) = \max \left\{ \begin{array}{c} D(i, j-1) \cdot f^d(\sigma_j) \\ D(i-1, j-1) \cdot f^s(s_i, \sigma_j) \\ D(i-1, j) \cdot f^i(s_i) \end{array} \right\}$$

The score of the alignment of $\{s_1 \ldots s_m\}$ with $\{\sigma_i \ldots \sigma_p\}$ is finally given by $D(m,p)$.

In a step 307, at the end of the post-processing, the query audio signal is matched in a near-exact or approximate manner as corresponding to the reference audio signal having the highest score $D(m,p)$. Such a match can furthermore be conditional on a step of comparison with a predetermined threshold: if the highest score $D(m,p)$ is below this threshold, no match is obtained for the query audio signal.

Figure 5:
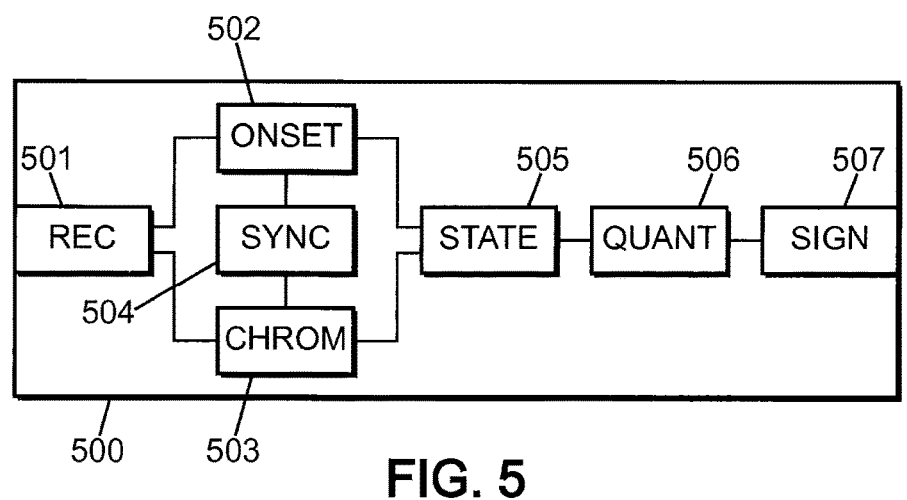
FIG. 5 shows a device for generating a signature of a musical audio signal of a given duration according to an embodiment of the invention.

FIG. 5 shows a device 500 for the generation of a signature of a musical audio signal of a given duration.

For this purpose, the device 500 comprises a reception unit 501 of a musical audio signal. As previously described, the musical audio signal can be a query audio signal or a reference audio signal.

The device 500 also comprises a modelling unit 502 of the musical audio signal in order to obtain, for each frequency band of a set of n frequency bands, a diagram representing the energy of the audio signal for the frequency band, as a function of time during the given duration. The diagrams obtained can be grouped together in the form of the chromagram 205 shown in FIG. 2. In particular, the modelling unit 502 is capable of implementing step 104 of the method shown in FIG. 1.

The device 500 comprises a first unit 502 for determining musical transition times $t_k$ of the audio signal during the given duration, which is capable of implementing step 103 of the method shown in FIG. 1.

In order to synchronize the operations carried out by the units 502 and 503, the device 500 comprises a synchronization unit 504 capable of implementing step 104 of the method shown in FIG. 1.

The device 500 comprises a unit 505 for associating each musical transition time $t_k$ with an item of local information comprising a vector of n values representative respectively of the energy of the audio signal in each of the n diagrams obtained between the musical transition time $t_k$ and a subsequent musical transition time $t_{k+1}$ and/or a vector of n values representative respectively of the energy of the audio signal in each of the n diagrams obtained between the musical transition time $t_k$ and a preceding musical transition time $t_{k-1}$. The association unit 505 is capable of implementing step 105 of the method shown in FIG. 1.

The device 500 also comprises a second unit 506 determining, as a function of the item of local information associated with each musical transition time $t_k$, a key associated with the musical transition time, the determined keys forming a first set of keys of the audio signal. The determination unit 506 is capable of implementing step 106 of the method shown in FIG. 1.

The device 500 comprises a unit 507 for generating a signature of the musical audio signal comprising couples of keys from the first set of keys and associated musical transition times $t_k$, which is capable of implementing step 107 of the method shown in FIG. 1. The generation unit 507 can moreover be capable of transmitting the musical audio signal as well as the generated signature to a remote entity.

Figure 6:
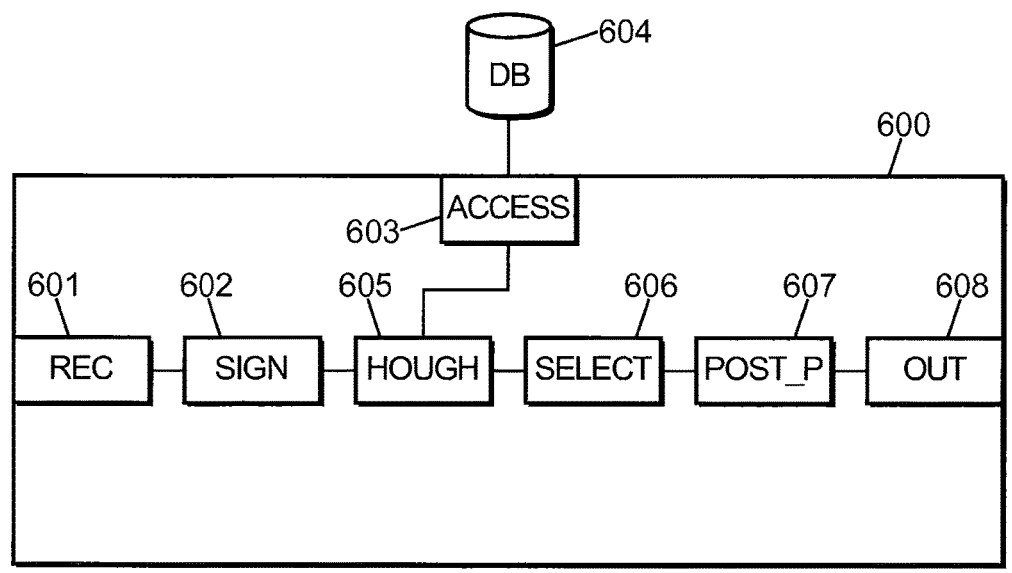
FIG. 6 shows a device 600 for identifying a query musical audio signal among reference musical audio signals, the query audio signal and the reference audio signals being represented by respective signatures obtained by implementation of the method according to FIG. 1, according to the invention.

For example, when the musical audio signal is a query audio signal, it can be transmitted with the generated signature to a remote server responsible for identifying the query audio signal, or more generally to a device according to FIG. 6. In this case the device 500 can be included in a user terminal such as a mobile telecommunications terminal, a portable or fixed computer, etc.

As a variant, when the musical audio signal is a reference audio signal, it can be transmitted with the generated signature to a reference database capable of storing the reference audio signal in association with the generated signature.

FIG. 6 shows a device 600 for the identification of a query musical signal among reference musical signals, the query signal and the reference signals being represented by respective signatures obtained by implementation of the method according to FIG. 1. For this purpose, the device 600 can be linked to the device 500 and can thus receive, by means of a reception unit 601, a query audio signal accompanied by a signature. In this case, a unit 602 extracts the signature of the query audio signal for communication to a constituting unit 603, described hereinafter. As a variant, the reception unit 601 can receive a query audio signal without a signature, the signature being generated by a unit 602. The unit 602 can thus correspond to the signature generation device 500 and can transmit the generated signature to the constituting unit 603.

Moreover, the device 600 can be linked to a database 604 storing signatures respectively associated with reference audio signals. In the database 604, each signature of a reference signal thus comprises a second set of keys with which are associated respective musical transition times $\tau_k$. According to the invention, the database 604 can be incorporated into the device 600.

The device 600 comprises the constituting unit 603, which accesses the database 604 and which, for each signature of a reference signal having at least one key from the second set in common with the first set of keys of the signature of the query signal, constitutes a third set of keys comprising the keys from the second set in common with the first set, each key from the third set being associated both with the musical transition time associated with the key in the signature of the reference signal, and with the musical transition time associated with the key in the signature of the query signal. The constituting unit 603 is capable of implementing step 303 of the method according to FIG. 3.

The device 600 also comprises a unit 605 for determining a score as a function of a matching between each couple of musical transition times associated with a key from the third set, which is capable of implementing step 304 of the method according to FIG. 3.

The device 600 comprises a unit 606 for selecting at least one signature of a reference signal having one of the highest scores, as a signature of a candidate reference signal for identifying the query signal. The selection unit 606 is capable of implementing step 305 of the method according to FIG. 3.

The device also comprises a post-processing unit 607 capable of implementing step 306 of the method according to FIG. 3, so as to determine among a set of candidate reference signals, the reference audio signal matching the query audio signal. The unit 607 moreover cannot return any result when the highest score of a reference audio signal is below the threshold introduced beforehand.

The device 600 comprises a transmission unit 608 for returning the reference audio signal matching the query audio signal to a user terminal or to a display unit of the device 600, not shown in FIG. 6.

The invention also provides for the case in which the device 600 does not include the unit 306. In this case, the transmission unit 608 transmits the candidate query signals to a remote entity which can include the unit 306, which is particularly advantageous in cases where the device 600 has limited calculation capacities.

It should be noted that the device 500 according to FIG. 5 and the device 600 according to FIG. 6 can be grouped together within one and the same overall device (when the device 500 replaces the unit 602 of the device 600). The overall device can then be used in a user terminal or in a remote server accessible from a user terminal. In the latter case, the user terminal transmits a query signal to the remote server.

The present invention also provides for a computer program containing instructions for implementation of the method shown in FIG. 1, when this program is executed by a processor, and a computer program containing instructions for implementation of the method shown in FIG. 3, when this program is executed by a processor.

What is claimed:

1. A computer-implemented method for the generation of a signature of a musical audio signal of a given duration, wherein the method comprises the following steps:
    modelling said musical audio signal in order to obtain, for each frequency band of a set of n frequency bands, with n strictly greater than 1, a diagram representing the energy of the audio signal for said frequency band, as a function of time during said given duration;
    determining musical transition times $t_k$ of the audio signal during the given duration, said musical transition times $t_k$ correspond respectively to local maximums of an onset function calculated on the basis of the musical audio signal;
    associating each musical transition time $t_k$ with an item of local information comprising a vector of n values representative respectively of the energy of the audio signal in each of the n diagrams obtained between the musical transition time $t_k$ and a subsequent musical transition time $t_{k+1}$ and/or a vector of n values representative respectively of the energy of the audio signal in each of the n diagrams obtained between the musical transition time $t_k$ and a preceding musical transition time $t_{k-1}$;
    determining, as a function of the item of local information associated with each musical transition time $t_k$, a key associated with said musical transition time, the determined keys forming a first set of keys of the audio signal;
    generating and storing in a memory a signature of the musical audio signal comprising couples, each couple comprising a key from the first set of keys and an associated musical transition time $t_k$.

2. The computer-implemented method according to claim 1, in which the keys in the first set of keys are obtained by quantization of the vectors of n values representative respectively of the energy of the signal in each frequency band in the set of n frequency bands in a period comprised between the musical transition time $t_k$ and a following musical transition time $t_{k+1}$ or by quantization of the vectors of n values representative respectively of the energy of the signal in each frequency band in the set of n frequency bands in a period comprised between the musical transition time $t_k$ and a preceding musical transition time $t_{k-1}$.

3. The computer implemented method according to claim 2, in which each key in the first set of keys is a vector of n bits, each bit of index i being determined by comparison between the energy value of index i in the vector of n values on the basis of which said key is determined, and the average of the values of said vector of n values.

4. The computer implemented method according to claim 3, in which if the energy value of index i in the vector of n values on the basis of which the key is determined is greater than the average of the values of said vector of n values, then the bit of index i is equal to 1, the bit of index i otherwise being equal to 0.

5. A non-transitory computer readable storage medium, with a program stored thereon, said program containing instructions for implementing the method according to claim 1, when this program is executed by a processor.

6. A device for generating a signature of a musical audio signal of a given duration, wherein the device comprises:
    a unit for modelling said musical audio signal in order to obtain, for each frequency band of a set of n frequency bands, a diagram representing the energy of the audio signal for said frequency band, as a function of time during said given duration;
    a first unit for determining musical transition times $t_k$ of the audio signal during the given duration;
    a unit for associating each musical transition time $t_k$ with an item of local information comprising a vector of n values representative respectively of the energy of the audio signal in each of the n diagrams obtained between the musical transition time $t_k$ and a subsequent musical transition time $t_{k+1}$ and/or a vector of n values representative respectively of the energy of the audio signal in each of the n diagrams obtained between the musical transition time $t_k$ and a preceding musical transition time $t_{k-1}$;
    a second unit for determining, as a function of the item of local information associated with each musical transition time $t_k$, a key associated with said musical transition time, the determined keys forming a first set of keys of the audio signal;
    a unit for generating a signature of the musical audio signal comprising couples, each couple comprising a key from the first set of keys and an associated musical transition time $t_k$.

* * * * *